Feb. 23, 1926.
W. M. SANDERS
WEIGHING SCALE
Filed March 23, 1925
1,573,869
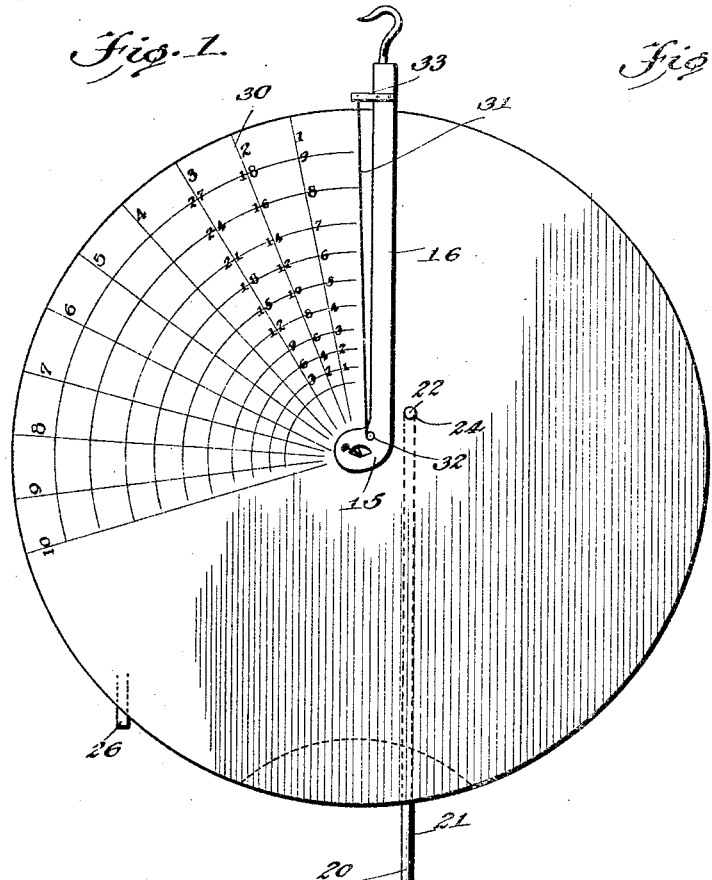
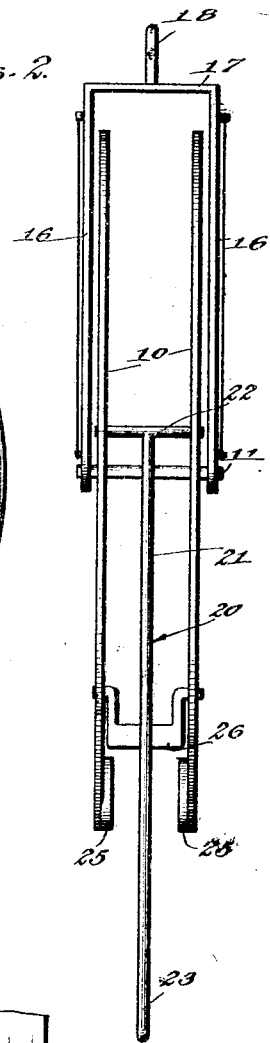
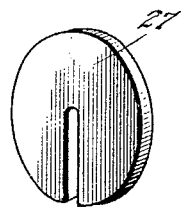
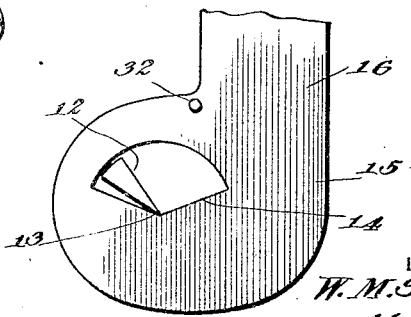
WITNESSES
INVENTOR
W. M. Sanders,
BY
ATTORNEYS Patented Feb. 23, 1926.

1,573,869

UNITED STATES PATENT OFFICE.

WILLIAM M. SANDERS, OF EAGLE CREEK, OREGON.

WEIGHING SCALE.

Application filed March 23, 1925. Serial No. 17,743.

*To all whom it may concern:*

Be it known that I, WILLIAM M. SANDERS, a citizen of the United States, and a resident of Eagle Creek, in the county of Clackamas and State of Oregon, have invented certain new and useful Improvements in Weighing Scales, of which the following is a specification.

This invention relates to an improvement in weighing scales, and aims to provide a device of this character which is of simple and durable construction and accurate and reliable in use, and which provides at a relatively slight cost a weighing scale meeting with the requirements of the law.

One of the principal objects of the invention is the provision of a scale which eliminates springs from its construction so that the scale will not lose its accuracy with use.

A further object is the provision of a weighing scale which can be adapted to meet the requirements of a delicate and sensitive instrument or which may be embodied in a platform scale having a capacity to weigh hundreds of pounds.

Other objects and advantages will reside in certain novel features of the construction, arrangement and combination of parts which will be hereinafter more fully described and particularly pointed out in the appended claims, reference being had to the accompanying drawings forming a part of this specification, and in which:

Figure 1 is a view in side elevation showing one embodiment of the invention,

Figure 2 is a view in end elevation of the device shown in Figure 1,

Figure 3 is an enlarged fragmentary view in elevation showing the type of bearing employed in the scale, and Figure 4 is a detail perspective view of one of the auxiliary weights that may be employed.

Referring to the drawings, the numeral 10 designates a pair of disks which are fixed to an axle or shaft 11, the disks 10 being spaced and parallel. The shaft 11 has its ends flattened as at 12 and formed with knife edges 13, the knife edges engaging in the lower end of a sector shaped opening 14 provided in the enlarged extremities 15 of the side bars 16 of a hanger or supporting frame 17. The hanger or supporting frame 17 may be secured to any suitable support, and a hook 18 is shown as providing a convenient means for supporting the hanger frame 17.

Suspension means for the articles to be weighed is designated generally at 20, and consists of a T-shaped rod having a shank 21 and a cross arm 22, the lower end of the shank 21 being formed with a hook 23. The ends of the cross arm 22 are pivotally supported in pivot openings 24 provided in the disks 10. The pivot openings 24 are located at distances from the center or axis of rotation of disks 10.

Weights 25 are applied to the disks 10 and are preferably secured to the disks adjacent their peripheries. One or more brackets 26 are pivotally mounted on the frame and are designed to receive auxiliary weights 27 when it is desired to increase the capacity of the scale. Preferably the arrangement is such that when the scale is not in use, and the weights 25 are located in the position shown in Figure 1, the point of the pivotal attachment of the suspension means to the disk is located to one side of and above the axis of rotation of the disks as shown in Figure 1.

Indicia 30 is applied to the exposed face of each disk and with the indicia of each disks an indicator wire 31 coacts, each indicator wire having one end connected as at 32 to the enlarged portion 15 of a side bar 16 of the hanger frame and having its upper end attached to a bracket 33 also supported on the side bar 16 of the hanger frame. The indicia 30 may not only read in terms of pounds and ounces, or in the other units of the measuring system used, but may be made a computing scale of the ordinary type.

I claim:—

1. In a weighing scale, a pair of disks, a shaft, said disks being connected at their centers to the shaft, a hanger coacting with the shaft to support the same for oscillating movement, weights connected to the disks, and suspension means for the articles to be weighed eccentrically connected to the disks, said suspension means including a T-shaped rod having a shank provided with a hook, and a cross arm having its ends pivotally connected to the disks.

2. In a weighing scale, a disk, means for pivotally supporting the disk, a weight connected to the disk at a point spaced from its center, and means for carrying the articles to be weighed, said last mentioned means being connected to the disk at a point spaced from its center, and a pivoted bracket mounted on the disk and adapted to facilitate the application of auxiliary weights to the disk.

WILLIAM M. SANDERS.